United States Patent
Choi et al.

(10) Patent No.: US 11,064,804 B2
(45) Date of Patent: *Jul. 20, 2021

(54) IMAGE SOUND DEVICE HAVING DISPLAY PORTION THAT CAN APPEAR/DISAPPEAR

(71) Applicant: SAMSUNG ELECTRONICS CO., LTD., Suwon-si (KR)

(72) Inventors: Hyun-yong Choi, Suwon-si (KR); Ha-Na Kim, Suwon-si (KR); Jee-hoon Park, Seoul (KR); You-na Choo, Seongnam-si (KR); Soo-hyun Whang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/534,013

(22) Filed: Aug. 7, 2019

(65) Prior Publication Data
US 2019/0357675 A1    Nov. 28, 2019

Related U.S. Application Data

(63) Continuation of application No. 16/071,785, filed as application No. PCT/KR2017/000306 on Jan. 10, 2017, now Pat. No. 10,492,607.

(30) Foreign Application Priority Data

Jan. 21, 2016 (KR) .................. 10-2016-0007747

(51) Int. Cl.
*H04N 5/655* (2006.01)
*H05K 5/02* (2006.01)
*A47B 81/06* (2006.01)

(52) U.S. Cl.
CPC ............ *A47B 81/064* (2013.01); *A47B 81/06* (2013.01); *H04N 5/655* (2013.01); *H05K 5/02* (2013.01);
(Continued)

(58) Field of Classification Search
CPC ........................................ H05K 7/16
See application file for complete search history.

(56) References Cited

U.S. PATENT DOCUMENTS

D244,204 S    5/1977  Briggs et al.
6,431,319 B1 *  8/2002  Myers ............... B62B 3/02
                                                              187/243

(Continued)

FOREIGN PATENT DOCUMENTS

CN    101789204 A    7/2010
EP    1898640 A1    3/2008
(Continued)

OTHER PUBLICATIONS

Communication dated Mar. 20, 2020, issued by the State Intellectual Property Office of P.R. China in counterpart Chinese Application No. 201780005733.6.
(Continued)

*Primary Examiner* — Jerry Wu
(74) *Attorney, Agent, or Firm* — Sughrue Mion, PLLC

(57) ABSTRACT

The present invention relates to an image sound device having a display portion that can appear/disappear, the device comprising: a housing, the upper end of which is open, and which has a space provided therein; a display portion installed inside the housing to be able to output images; an elevating unit installed inside the housing and below the display portion such that the display portion can be made to protrude through the upper end of the housing; and a motor control portion for controlling the elevating unit (Continued)

such that the display portion can be positioned at two or more heights.

11 Claims, 15 Drawing Sheets

(52) U.S. Cl.
CPC ... *A47B 2200/04* (2013.01); *A47B 2220/0002* (2013.01)

(56) References Cited

U.S. PATENT DOCUMENTS

| | | | |
|---|---|---|---|
| 7,806,490 | B1 | 10/2010 | Buehl |
| 8,594,361 | B2 | 11/2013 | Noguchi et al. |
| 9,473,839 | B2 | 10/2016 | Yu |
| 9,619,197 | B2 | 4/2017 | Bang et al. |
| 2007/0035671 | A1* | 2/2007 | Ryu .................. H04N 5/64 348/794 |
| 2008/0165481 | A1 | 7/2008 | Kirschner et al. |
| 2010/0183186 | A1 | 7/2010 | Noguchi et al. |
| 2012/0230411 | A1 | 9/2012 | Liu et al. |
| 2015/0215692 | A1* | 7/2015 | Yu .................. H04N 5/642 381/388 |
| 2015/0262331 | A1 | 9/2015 | Bang et al. |
| 2016/0295711 | A1 | 10/2016 | Ryu et al. |

FOREIGN PATENT DOCUMENTS

| | | |
|---|---|---|
| JP | 2004337430 A | 2/2004 |
| KR | 101999019109 A | 3/1999 |
| KR | 2019990032452 U | 7/1999 |
| KR | 1020070018556 A | 2/2007 |
| KR | 101291948 B1 | 7/2013 |
| KR | 1020140125540 A | 10/2014 |
| KR | 1020140017960 A | 2/2015 |
| KR | 1020150106211 A | 9/2015 |
| WO | 2015111890 A1 | 7/2015 |

OTHER PUBLICATIONS

International Search Report (PCT/ISA/210), issued by International Searching Authority in corresponding International Application No. PCT/KR2017/000306, dated Apr. 13, 2017.
Written Opinion (PCT/ISA/237) issued by the International Searching Authority in corresponding International Application No. PCT/KR2017/000306, dated Apr. 13, 2017.
Communication dated Oct. 30, 2018, issued by the European Patent Office in counterpart European Application No. 17741606.2.
Communication dated Dec. 4, 2019, from the European Patent Office in counterpart European Application No. 17741606.2.
Communication dated Jan. 27, 2021 by the European Patent Office in corresponding European Application No. 17 741 606.2.
Communication dated May 10, 2021 by the Intellectual Property Office of India in counterpart Indian Patent Application No. 201817028239.

* cited by examiner

IMAGE SOUND DEVICE HAVING DISPLAY PORTION THAT CAN APPEAR/DISAPPEAR

CROSS-REFERENCE TO RELATED APPLICATIONS

This application is a continuation of application Ser. No. 16/071,785, filed Jul. 20, 2018, which is a National Stage Entry of International Application No. PCT/KR2017/00306, filed Jan. 10, 2017, in the Korean Intellectual Property Office, which is based upon and claims priority under 35 U.S.C. § 119 to Korean Patent Application No. 10-2016-0007747, filed on Jan. 21, 2016, in the Korean Intellectual Property Office, the disclosures of which are incorporated by reference herein in their entireties.

TECHNICAL FIELD

The present disclosure relates to an image sound device, and more particularly, to an image sound device having a display part that can appear and disappear.

BACKGROUND ART

According to the development of electronic technology, sound devices for reproducing sounds such as songs and image devices through which broadcasting can be watched have become widespread.

However, since the sound devices and image devices are manufactured and sold as separate devices, the user needs to purchase the sound devices and the image devices, separately.

In the case of the image devices, a screen on which an image is displayed is always exposed, so that the screen cannot be protected or hidden.

On the other hand, the image device may be configured to display two or more aspect ratios of images on the screen. For example, when the screen of the image device has an aspect of 16:9, the image device can display images having an aspect ratio of 16:9 and images having an aspect ratio of 21:9.

However, when such a conventional image device displays an image having an aspect ratio of 21:9, there exists a black screen in which the image is not displayed on the upper and lower portions of the screen or the lower portion of the screen. When the black screen is present as described above, there is a problem that the viewer is less immersed when viewing the image.

The sound devices may be configured to have a screen for outputting information or lyrics of a song to be reproduced. However, since the size of the screen provided in the sound device is small, it is possible to view the contents displayed only when the user is close to the sound device. In addition, there is a problem that an image related to a sound to be reproduced cannot be output.

DISCLOSURE OF INVENTION

The present disclosure has been developed in order to overcome the above problems. An aspect of the present disclosure relates to an image sound device that can perform two functions of a sound device and an image device and has a display part that can appear and disappear, in which the display part is accommodated in a housing and a height of the display part projecting outside of the housing can be adjusted.

According to an aspect of the present disclosure, an image sound device having a display part that can appear and disappear may include a housing, a top end of which is open and which has a space provided therein; a display part provided inside the housing and configured to output an image; a lifter provided below the display part inside the housing and configured to protrude the display part through the top end of the housing; and a motor controller configured to control the lifter wherein the display part is positioned at at least two heights.

The lifter may include a supporting plate supporting a bottom end of the display part; a first link rotatably disposed at one end of the supporting plate; a second link rotatably disposed at another end of the supporting plate and intersecting with the first link; and a driver configured to drive another end of the first link and another end of the second link wherein the another end of the first link and the another end of the second link are moved toward or away from each other in a horizontal direction.

The driver may include a first rack gear rotatably connected to the another end of the first link; a second rack gear provided parallel to the first rack gear and rotatably connected to the another end of the second link; a pinion provided between the first rack gear and the second rack gear and configured to move the first rack gear and the second rack gear in directions opposite to each other; and a motor configured to rotate the pinion.

The driver may include a pair of first guide pins provided at both ends of the first rack gear; a pair of second guide pins provided at both ends of the second rack gear; a first rack gear support member provided parallel to the first rack gear and provided with a first guide groove into which the pair of first guide pins are inserted; and a second rack gear support member provided parallel to the second rack gear and provided with a second guide groove into which the pair of second guide pins are inserted.

BEST MODE FOR CARRYING OUT THE INVENTION

Hereinafter, embodiments of an image sound device having a display part that can appear and disappear according to the present disclosure will be described in detail with reference to the accompanying drawings.

It is to be understood that the embodiments described below are provided for illustrative purpose only, and that the present disclosure may be embodied with various modifications different form exemplary embodiments described herein. However, in the following description below, detailed description of well-known functions or components will be omitted when it may be unnecessary to obscure the subject matter of the present disclosure. Further, the accompanying drawings may be not drawn to scale in order to facilitate understanding of the invention, but the dimensions of some of the components may be exaggerated.

Figure 1:
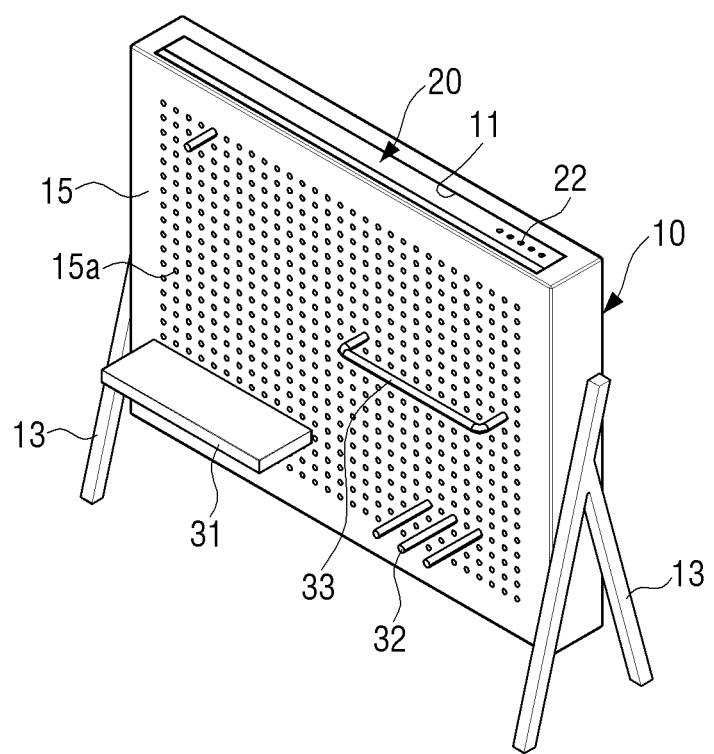
FIG. 1 is a perspective view illustrating an image sound device having a display part that can appear and disappear according to an embodiment of the present disclosure.
Figure 2:
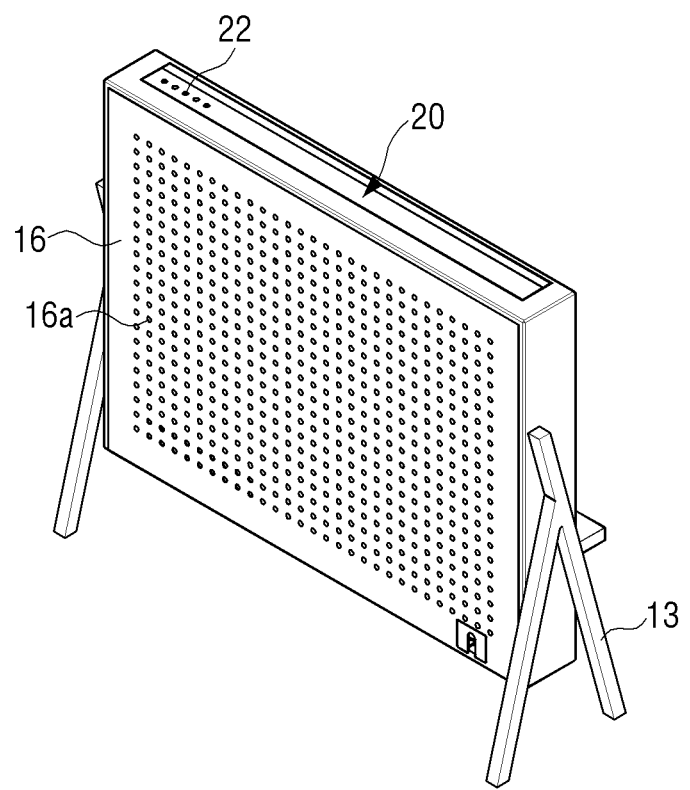
FIG. 2 is a rear perspective view of the image sound device having a display part that can appear and disappear of FIG. 1.
Figure 3:
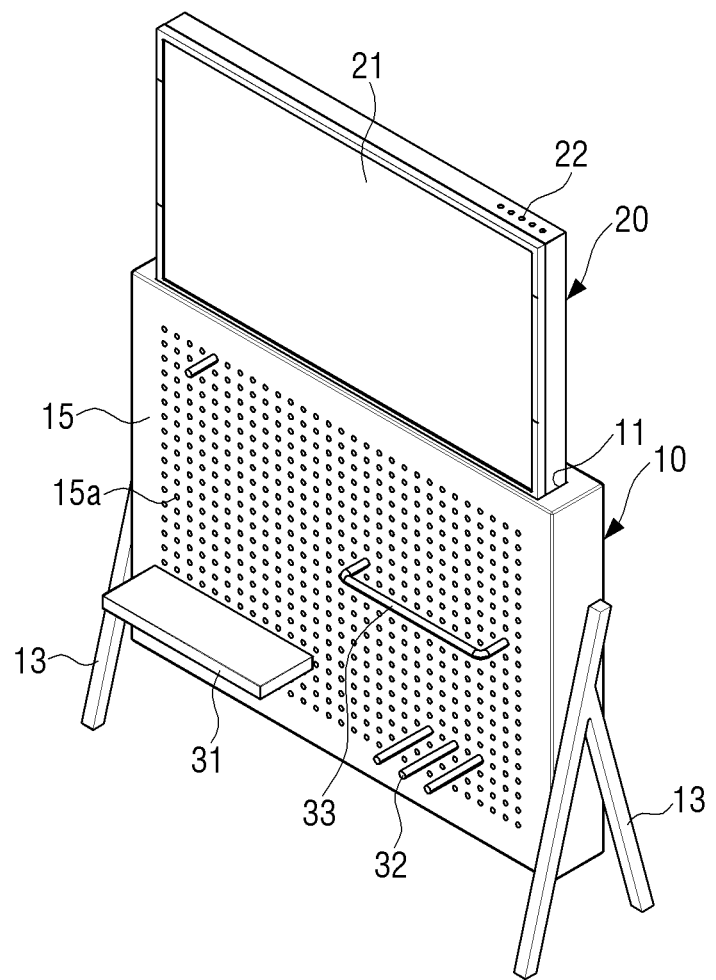
FIG. 3 is a perspective view illustrating a state in which the display part of the image sound device having the display part that can appear and disappear of FIG. 1 is completely exposed from a housing.
Figure 4:
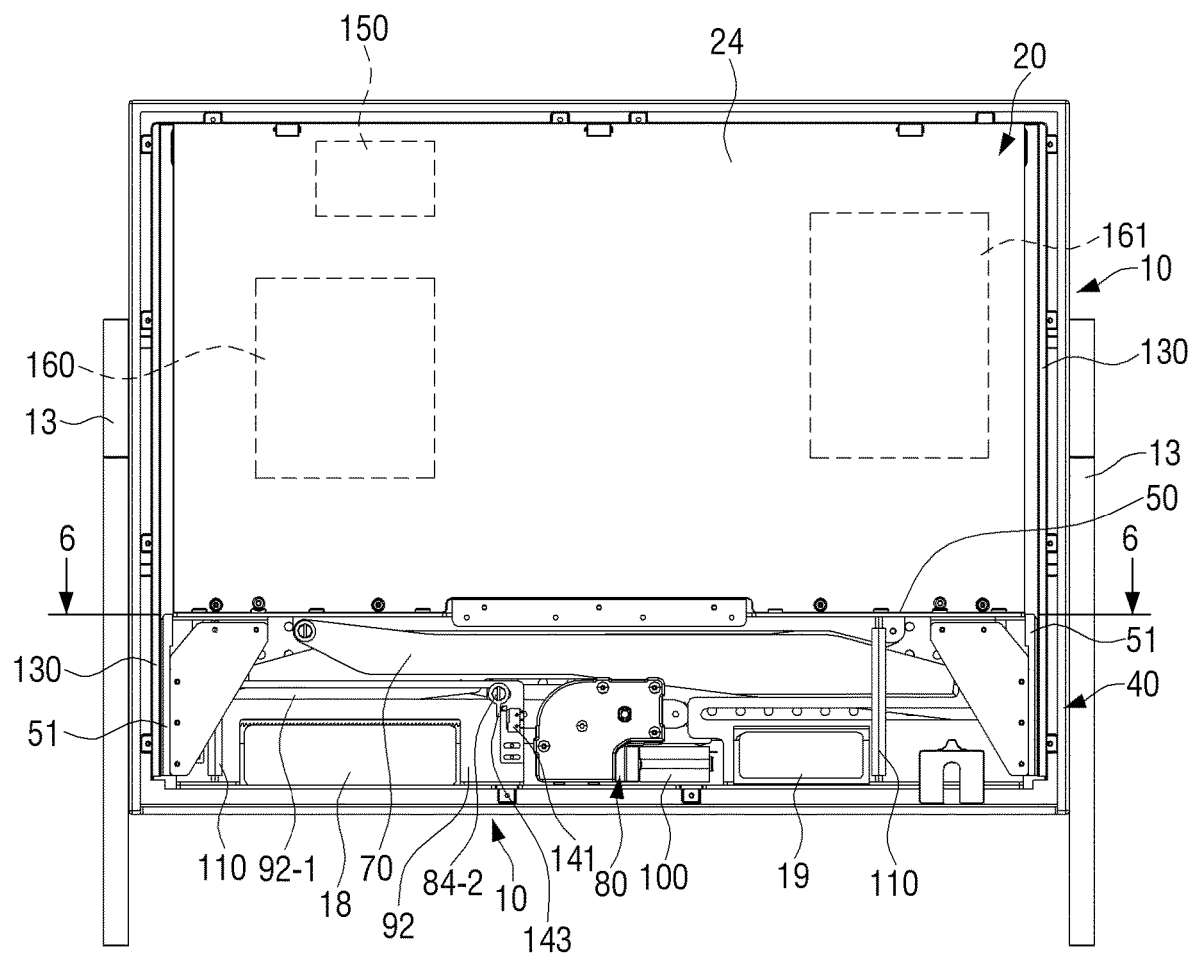
FIG. 4 is a view illustrating an image sound device having a display part that can appear and disappear according to an embodiment of the present disclosure in which a rear side of a housing is removed.
Figure 5:
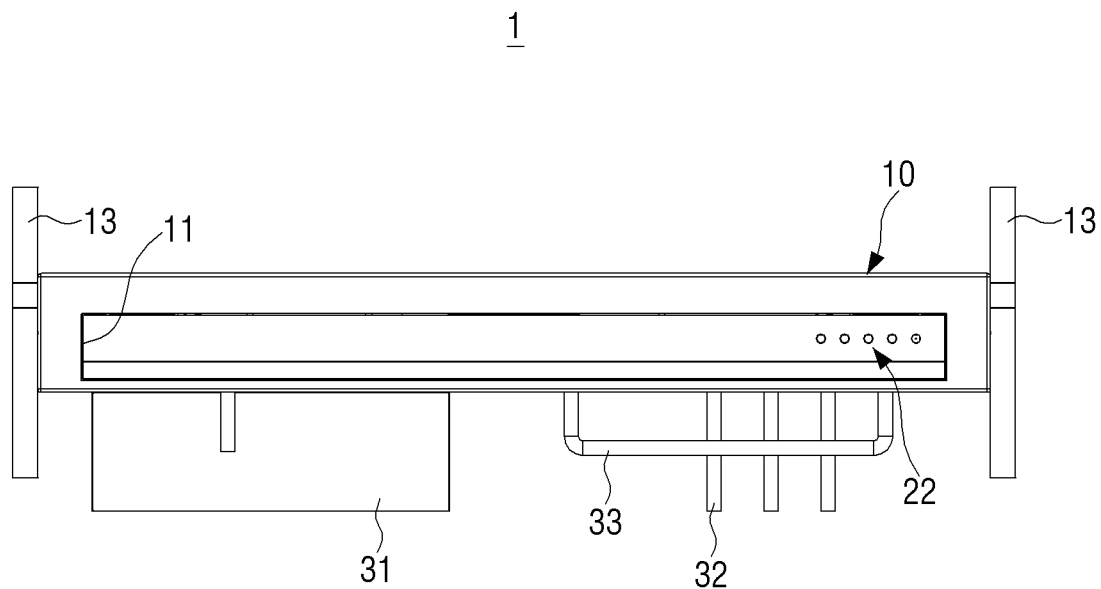
FIG. 5 is a plan view illustrating an image sound device having a display part that can appear and disappear according to an embodiment of the present disclosure.

FIG. 1 is a perspective view illustrating an image sound device having a display part that can appear and disappear according to an embodiment of the present disclosure, and FIG. 2 is a rear perspective view of the image sound device having a display part that can appear and disappear of FIG. 1. FIG. 3 is a perspective view illustrating a state in which the display part of the image sound device having the display part that can appear and disappear in FIG. 1 is completely exposed from a housing. FIG. 4 is a view illustrating an image sound device having a display part that can appear and disappear according to an embodiment of the present disclosure in which a rear side of a housing is removed. FIG. 5 is a plan view illustrating an image sound device having a display part that can appear and disappear according to an embodiment of the present disclosure.

Referring to FIGS. 1 to 5, an image sound device 1 having a display part that can appear and disappear according to an embodiment of the present disclosure may include a housing 10, a display part 20, and a lifter 40.

The housing 10 is provided with a space for accommodating the display part 20 thereinside, and an opening 11 is provided in a top end of the housing 10. Accordingly, the housing 10 is formed in a shape corresponding to the shape of the display part 20, and the display part 20 protrudes upward from the housing 10 through the opening 11 formed in the top end of the housing 10. The housing 10 may be formed so that the image sound device 1 having a display part that can appear and disappear according to an embodiment of the present disclosure functions as furniture for decorating the room. Thus, the outer surface of the housing 10 may be decorated in various ways.

The display part 20 may be configured to be used as an image device capable of displaying images and as a sound device capable of reproducing or recording sounds. For example, the image sound device 1 may be used as an image device such as a TV, a monitor, or the like, and may be used as a sound device capable of reproducing, outputting, and recording sound sources of various formats. Accordingly, the display part 20 may be formed in a substantially rectangular flat plate shape, such as a general LCD TV. Alternatively, the display part 20 may be formed in a curved plate shape bent at a certain curvature. In the following embodiments, the display part 20 is formed in a flat plate shape.

The display part 20 is provided with a controller 160 configured to control the display part 20 to display an image on a screen 21 and output sound. In addition, the display part 20 may include a power supplier 161 for supplying power. The controller 160 and the power supplier 161 may be embedded in the rear surface 24 of the display part 20. The display part 20 may include a speaker (not illustrated) capable of outputting a reproduced sound. Alternatively, the sound reproduced by the display part 20 may be output through a speaker provided outside the display part 20.

The housing 10 is formed in a hollow rectangular parallelepiped shape corresponding to the shape of the display part 20 to accommodate the display part 20 which is the rectangular flat plate. The rectangular opening 11 is provided in the top end of the housing 10, so that the display part 20 may be inserted into the housing 10 through the opening 11 of the housing 10.

On both side surfaces of the housing 10, a pair of support stands 13 for supporting the housing 10 with respect to a bottom surface are provided. The pair of support stands 13 are disposed so that the bottom of the housing 10 is spaced apart from the bottom surface. Here, the bottom surface refers to a floor of a place where the housing 10 is disposed, for example, a room, a living room, a bedroom, and the like.

The front surface 15 of the housing 10 is provided with a plurality of through holes 15a. The plurality of through holes 15a are formed to fix accessories 31, 32, and 33. The accessories 31, 32, and 33 are fixed by using the plurality of through holes 15a formed in the front surface 15 of the housing 10 and are formed to be able to support objects such as books with respect to the housing 10. For example, referring to FIGS. 1, 3, and 5, one accessory 31 may be formed in the shape of a flat plate that can be fixed using some of the plurality of through holes 15a. Another accessory 32 may be formed in a rod shape whose one end is fixed to the through hole 15a. The other accessory 33 may be formed in a substantially U-shape whose both ends are fixed to the through holes 15a. Alternatively, although not illustrated, an accessory may be formed in a substantially L shape whose one end is fixed to the through hole 15a. The accessories 31, 32, and 33 illustrated in FIGS. 1, 3, and 5 are only examples, and the shape of the accessory is not limited thereto.

A plurality of through holes 16a may be formed on the rear surface 16 of the housing 10 in the same manner as the front surface 15 of the housing 10. The above-described accessories 31, 32, and 33 may be fixed to the plurality of through holes 16a formed in the rear surface 16 of the housing 10 as well.

At least one speaker 18 and 19 configured to output sound reproduced by the display part 20 to the outside may be provided near the bottom of the inside of the housing 10. In the present embodiment, two speakers 18 and 19 are provided inside the housing 10 in addition to the display part 20. The sound output from the two speakers 18 and 19 may be transmitted to the outside through the plurality of through holes 15a formed in the front surface 15 of the housing 10. Alternatively, although not illustrated, openings corresponding to the speakers 18 and 19 may be formed on the front surface 15 of the housing 10 so that the front surfaces of the speakers 18 and 19 are exposed to the outside. Alternatively, the at least one speaker 18 and 19 may be provided outside the housing 10.

When the at least two speakers 18 and 19 are provided separately from the display part 20 as described above, a large speaker may be used as compared to a speaker built in the display part 20 so that it is possible to provide a good sound when used as a sound device.

The lifter 40 is disposed inside the housing 10 below the display part 20 and is configured to move the display part 20 up and down with respect to the housing 10. In other words, the lifter 40 is configured to protrude the display part 20 to the outside of the housing 10 through the opening 11 at the top end of the housing 10 to expose the screen 21 and to lower the protruded display part 20 to be accommodated inside the housing 10. When the display part 20 is received in the housing 10, the screen 21 of the display part 20 is protected by the housing 10.

The lifter 40 may be configured to position the display part 20 at at least two heights. For example, the lifter 40 is configured to move the display part 20 between a first position (see FIGS. 1 and 4) in which the display part 20 is completely accommodated in the housing 10 and is not exposed to the outside of the housing 10 and a second position (see FIGS. 3 and 7) where the display part 20 is completely exposed to the outside of the housing 10. As another example, the lifter 40 may be configured to position the display part 20 at a position where a portion of the screen 21 of the display part 20 is exposed.

In the present embodiment, the lifter 40 is configured to be able to position the display part 20 at an arbitrary position between the first position and the second position.

Hereinafter, the lifter used in the image sound device having a display part that can appear and disappear according to an embodiment of the present disclosure will be described in detail with reference to FIGS. 4, 6, 7, 8, and 9.

Figure 6:
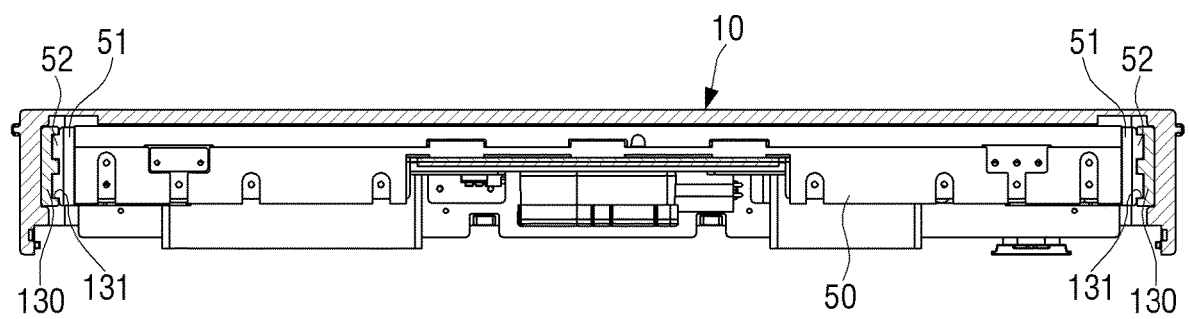
FIG. 6 is a cross-sectional view illustrating the image sound device having a display part that can appear and disappear of FIG. 4 taken along line 6-6.
Figure 7:
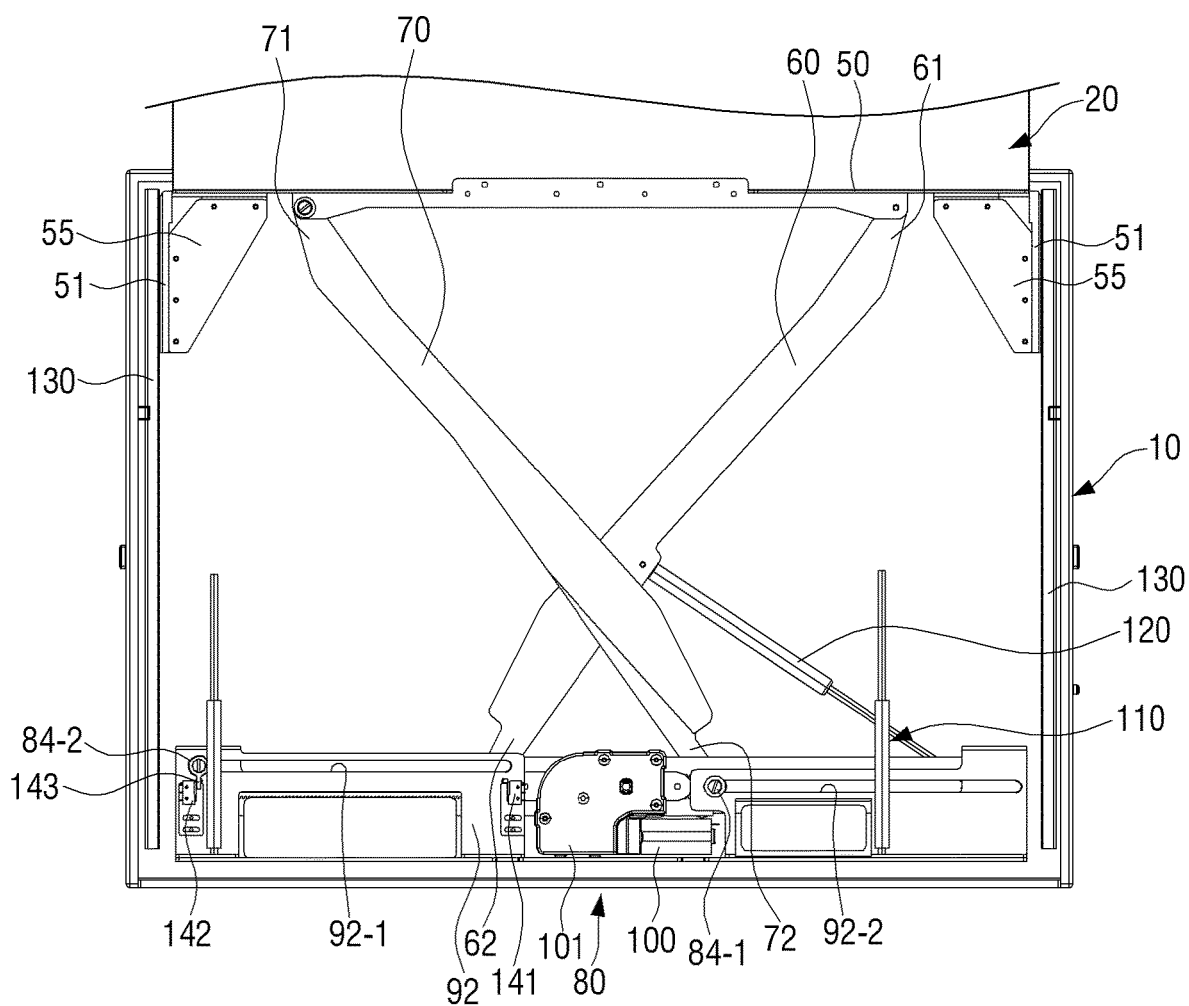
FIG. 7 is a view illustrating a lifter when a display part of an image sound device having a display part that can appear and disappear according to an embodiment of the present disclosure is completely exposed.
Figure 8:
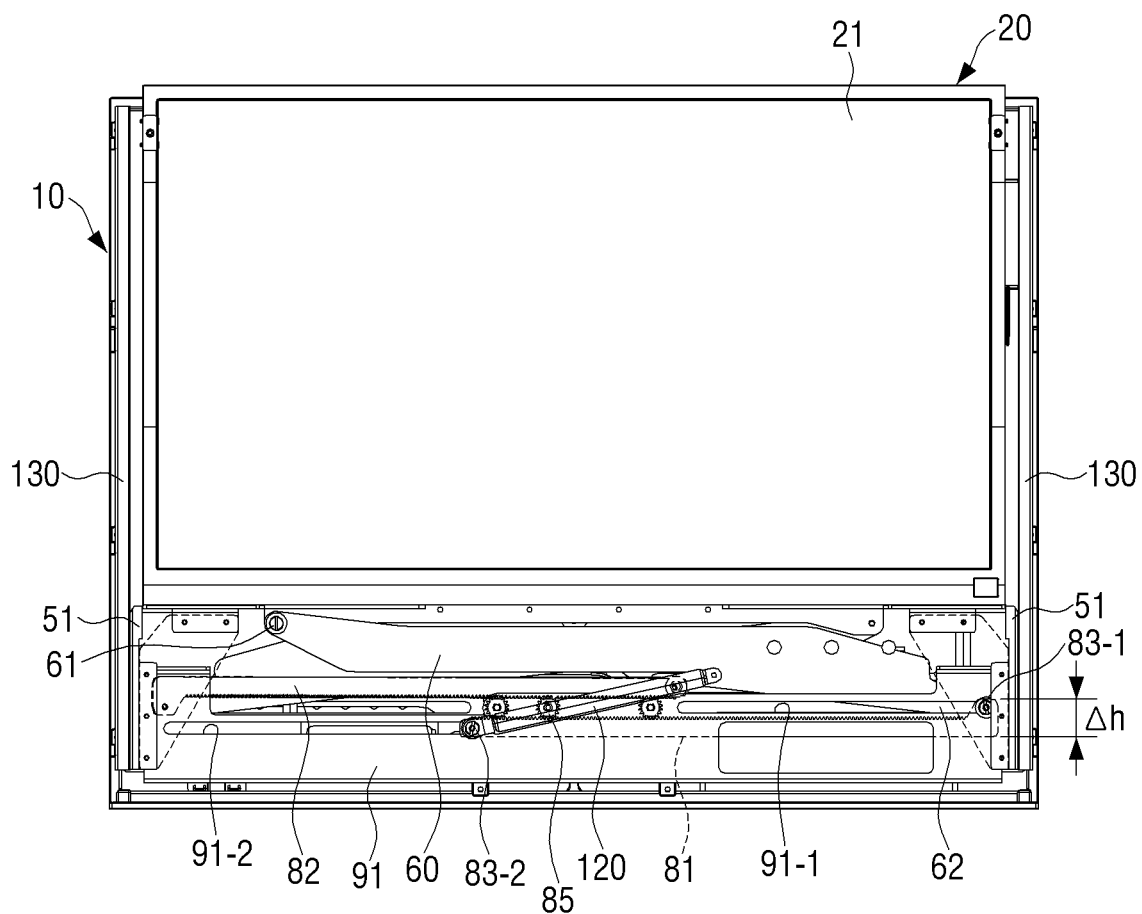
FIG. 8 is a view of the lifter of FIG. 4 viewed from the opposite side.
Figure 9:
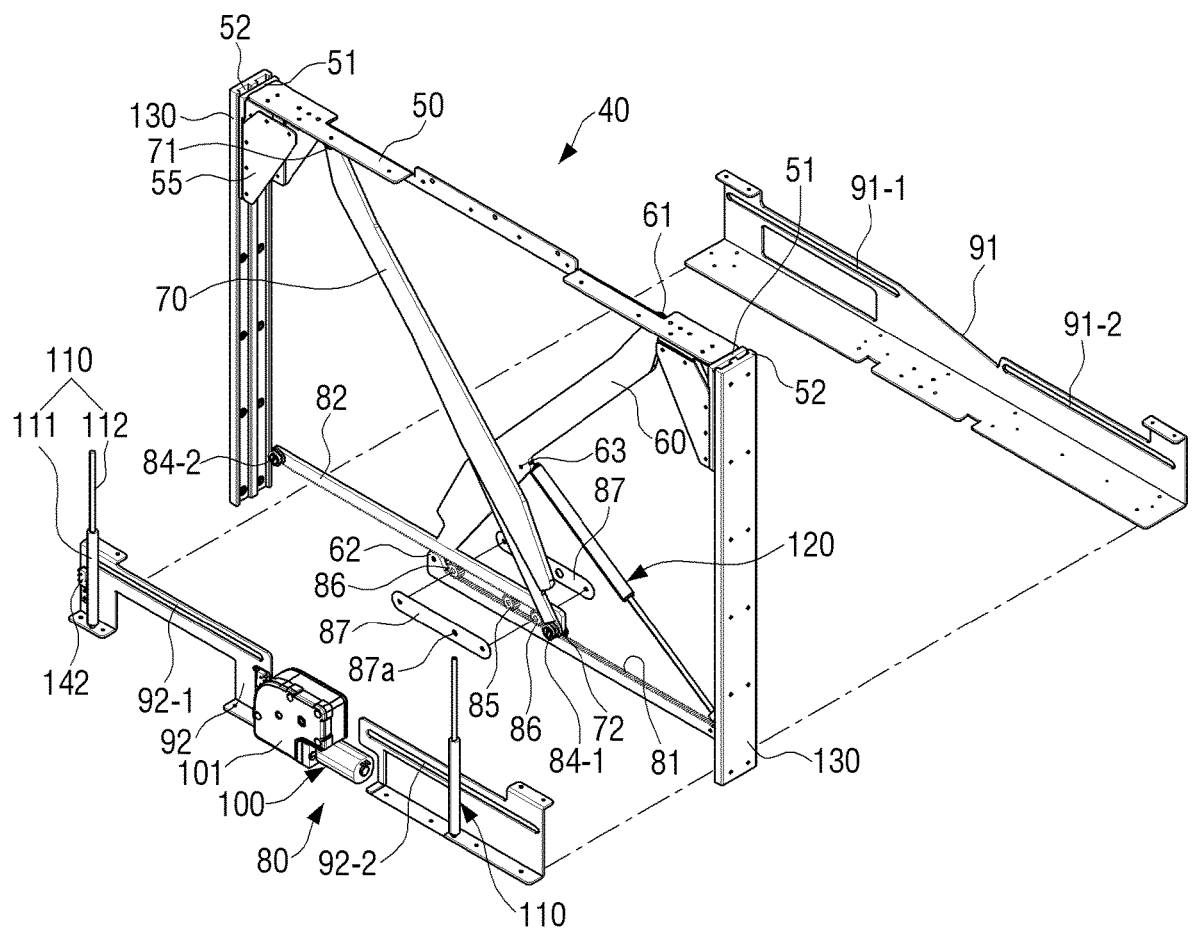
FIG. 9 is an exploded perspective view illustrating a lifter of an image sound device having a display part that can appear and disappear according to an embodiment of the present disclosure.

FIG. 6 is a cross-sectional view illustrating the image sound device having a display part that can appear and disappear of FIG. 4 taken along line 6-6. FIG. 7 is a view illustrating a lifter when a display part of an image sound device having a display part that can appear and disappear according to an embodiment of the present disclosure is completely exposed, and FIG. 8 is a view of the lifter of FIG. 4 viewed from the opposite side. FIG. 9 is an exploded perspective view illustrating a lifter of an image sound device having a display part that can appear and disappear according to an embodiment of the present disclosure.

Referring to FIGS. 4 and 6 to 9, the lifter 40 is disposed inside the housing 10 so as not to be exposed to the outside of the housing 10. The lifter 40 may include a supporting plate 50, a first link 60, a second link 70, a driver 80, and a motor controller 150.

The supporting plate 50 is fixed to the bottom end of the display part 20 accommodated in the housing 10 and supports the display part 20. The supporting plate 50 may be formed in the shape of a rectangular plate having a shape and size corresponding to the bottom end of the display part 20.

The first link 60 is rotatably disposed at one end of the supporting plate 50. In detail, one end 61 of the first link 60 is rotatably disposed at one end portion of the supporting plate 50. The other end 62 of the first link 60 is connected to the driver 80 and is movable by the driver 80.

The second link 70 is rotatably disposed at the other end of the supporting plate 50 and is disposed to intersect with the first link 60. In detail, one end 71 of the second link 70 is rotatably disposed at the other end portion of the supporting plate 50, so that the first link 60 and the second link 70 are arranged in an X shape. The other end 72 of the second link 70 is connected to the driver 80 and is movable by the driver 80.

The driver 80 is configured to drive the other end 62 of the first link 60 and the other end 72 of the second link 70 so that the other end 62 of the first link 60 and the other end 72 of the second link 70 are moved toward or away from each other in the horizontal direction. The driver 80 may include a first rack gear 81 connected to the first link 60, a second rack gear 82 connected to the second link 70, a pinion 85 to drive the first rack gear 81 and the second rack gear 82, and a motor 100 to rotate the pinion 85.

The first rack gear 81 and the second rack gear 82 are disposed parallel to each other so that one surfaces on which gear teeth are formed face each other. The pinion 85 is provided between the first rack gear 81 and the second rack gear 82. In detail, the first rack gear 81 is provided below the pinion 85, and the second rack gear 82 is provided above the pinion 85. The pinion 85 is provided to engage with the gear teeth of the first rack gear 81 and the second rack gear 82. Accordingly, when the pinion 85 rotates, the first rack gear 81 and the second rack gear 82 horizontally move in opposite directions to each other.

The other end 62 of the first link 60 is rotatably connected to one end of the first rack gear 81. Further, a pair of first guide pins 83-1 and 83-2 are provided at both ends of the first rack gear 81. In other words, the first rack gear 81 is provided with two first guide pins 83-1 and 83-2. One first guide pin 83-1 provided at one end of the first rack gear 81 may be disposed coaxially with a hinge shaft which connects the first link 60 and the first rack gear 81 to rotate with respect to each other. Further, the two first guide pins 83-1 and 83-2 are not provided at the same level but may be provided in the first rack gear 81 to have different levels. As illustrated in FIG. 8, the pair of first guide pins 83-1 and 83-2 may be provided so that the mounting level of the first guide pin 83-1 provided on the hinge shaft connected to the first link 60 is higher by a predetermined height Δh than the mounting level of the first guide pin 83-2 provided on the other end of the first rack gear 81.

The pair of first guide pins 83-1 and 83-2 provided in the first rack gear 81 may be guided by a first rack gear support member 91 which is disposed parallel to one side of the first rack gear 81 and faces the first rack gear 81. Therefore, the first rack gear support member 91 is provided with two first guide grooves 91-1 and 91-2 in which the pair of first guide pins 83-1 and 83-2 are inserted and guided.

The two first guide grooves 91-1 and 91-2 include an upper first guide groove 91-1 and a lower first guide groove 91-2 which are formed to have the same height difference as the height difference Δh between the pair of the first guide pins 83-1 and 83-2 provided in the first rack gear 81. The upper first guide groove 91-1 guides the first guide pin 83-1 of the first rack gear 81 and the lower first guide groove 91-2 guides the first guide pin 83-2. The first guide grooves 91-1 and 91-2 guide the movement of the first rack gear 81 and restrict the moving distance of the first rack gear 81. Therefore, the first guide grooves 91-1 and 91-2 are formed as elongated holes. The elongated holes are formed to have a length so that the pair of the first guide pins 83-1 and 83-2 of the first rack gear 81 do not interfere with first rack gear support member 91 when the supporting plate 50 of the lifter 40 is positioned at the first position where the supporting plate 50 is positioned at the lowest position and the second position where the supporting plate 50 is positioned at the highest position.

A guide groove may be formed on the outer circumferential surface of each of the first guide pins 83-1 and 83-2 so that the pair of first guide pins 83-1 and 83-2 are stably guided by the first guide grooves 91-1 and 91-2.

The other end 72 of the second link 70 is rotatably connected to one end of the second rack gear 82. Further, as illustrated in FIGS. 7 and 9, a pair of second guide pins 84-1 and 84-2 are provided at both ends of the second rack gear 82. In other words, the second rack gear 82 is provided with two second guide pins 84-1 and 84-2. One second guide pin 84-1 provided at one end of the second rack gear 82 may be disposed coaxially with a hinge shaft which connects the second link 70 and the second rack gear 82 to rotate with respect to each other. Further, the two second guide pins 84-1 and 84-2 are not provided at the same level but may be provided in the second rack gear 82 to have different levels. As illustrated in FIGS. 7 and 9, the pair of second guide pins 84-1 and 84-2 may be provided so that the mounting level of the second guide pin 84-1 provided on the hinge shaft connected to the second link 70 is higher than the mounting level of the second guide pin 84-2 provided on the other end of the second rack gear 82. The pair of second guide pins 84-1 and 84-2 provided in the second rack gear 82 are disposed to protrude in a direction opposite to the pair of first guide pins 83-1 and 83-2 provided in the first rack gear 81.

The pair of second guide pins 84-1 and 84-2 provided in the second rack gear 82 may be guided by a second rack gear support member 92 which is disposed parallel to one side of the second rack gear 82 and faces the second rack gear 82. Therefore, the second rack gear support member 92 is provided with two second guide grooves 92-1 and 92-2 in which the pair of second guide pins 84-1 and 84-2 are inserted and guided.

The two second guide grooves 92-1 and 92-2 include an upper second guide groove 92-1 and a lower second guide groove 92-2 which are formed to have the same height difference as the height difference between the pair of the second guide pins 84-1 and 84-2 provided in the second rack gear 82. The upper second guide groove 92-1 guides the second guide pin 84-2 of the second rack gear 82 and the lower second guide groove 92-2 guides the second guide pin 84-1. The second guide grooves 92-1 and 92-2 guide the movement of the second rack gear 82 and restrict the moving distance of the second rack gear 82. Therefore, the second guide grooves 92-1 and 92-2 are formed as elongated holes. The elongated holes are formed to have a length so that the pair of the second guide pins 84-1 and 84-2 of the second rack gear 82 do not interfere with second rack gear support member 92 when the supporting plate 50 of the lifter 40 is positioned at the first position where the supporting plate 50 is positioned at the lowest position and the second position where the supporting plate 50 is positioned at the highest position. The second rack gear support member 92 is disposed to face the first rack gear support member 91 in parallel.

A guide groove may be formed on the outer circumferential surface of each of the second guide pins 84-1 and 84-2 in the same manner as the first guide pins 83-1 and 83-2 so that the pair of second guide pins 84-1 and 84-2 are stably guided by the second guide grooves 92-1 and 92-2.

The pinion 85 provided between the first rack gear 81 and the second rack gear 82 is rotated by the motor 100. Therefore, the pinion 85 is disposed directly on the motor shaft of the motor 100. When the motor 100 in which a speed reducer 101 is integrally disposed is used in the driver 80 as in the present embodiment, the pinion 85 is provided on the output shaft of the speed reducer 101. Therefore, when the output shaft of the speed reducer 101 is rotated by the rotation of the motor 100, the pinion 85 also rotates integrally with the output shaft. In the embodiment as illustrated in FIG. 7, the geared motor 100 in which the gear reducer 101 is integrally provided is used in the driver 80.

Figure 14:
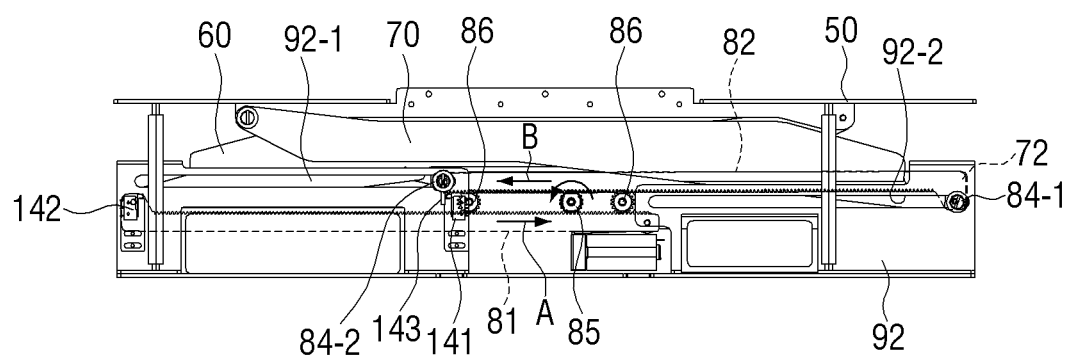
FIG. 14 is a view illustrating a state in which a lifter of an image sound device having a display part that can appear and disappear according to an embodiment of the present disclosure is completely folded.

As illustrated in FIGS. 9 and 14, since the first rack gear 81 and the second rack gear 82 are provided below and above the pinion 85, when the pinion 85 rotates, the first rack gear 81 and the second rack gear 82 move in opposite directions.

For example, in FIG. 14, when the pinion 85 rotates in the clockwise direction, the first rack gear 81 and the second rack gear 82 are moved so that one end of the first rack gear 81 connected to the first link 60 and one end of the second rack gear 82 connected to the second link 70 are moved away from each other. When the one end of the first rack gear 81 to which the first link 60 is connected and the one end of the second rack gear 82 to which the second link 70 is connected are moved away from each other, the supporting plate 50 is lowered by the first link 60 and the second link 70 connected to the first rack gear 81 and the second rack gear 82, respectively.

When the pinion 85 rotates in the counter-clockwise direction, the first rack gear 81 and the second rack gear 82 are moved in the direction in which the one end of the first rack gear 81 connected to the first link 60 and the one end of the second rack gear 82 connected to the second link 70 approach each other (see arrows A and B in FIG. 14). When the one end of the first rack gear 81 to which the first link 60 is connected and the one end of the second rack gear 82 to which the second link 70 is connected are moved in the direction in which they approach each other, the supporting plate 50 is raised by the first link 60 and the second link 70 connected to the first rack gear 81 and the second rack gear 82, respectively.

In addition, two idle gears 86, that is, a first idle gear and a second idle gear may be provided between the first rack gear 81 and the second rack gear 82 so that the first rack gear 81 and the second rack gear 82 move stably. The two idle gears 86 are provided on the left and right sides of the pinion 85.

Further, the pinion 85 and the two idle gears 86 may be supported by support brackets 87. In other words, the two idle gears 86 may be rotatably disposed on the support brackets 87. The support brackets 87 are provided with a through hole 87a through which a shaft provided with the pinion 85 passes. When the pinion 85 and the two idle gears 86 are supported by the support brackets 87, the distance between the pinion 85 and the two idle gears 86 may be kept constant when the first rack gear 81 and the second rack gear 82 are moved by the pinion 85.

The lifter 40 may further include a position detector capable of detecting the position of the supporting plate 50. The position detector is configured to detect the position of the supporting plate 50 when the supporting plate 50 is moved up and down by the lifter 40.

As an example, the position detector may be configured to detect the case where the supporting plate 50 is positioned at the first position where the supporting plate 50 is the lowest and the case where the supporting plate 50 is positioned at the second position where the supporting plate 50 is the highest. Referring to FIG. 7, the position detector may include two position detecting sensors, that is, a first position detecting sensor 141 and a second position detecting sensor 142, which are disposed near the upper second guide groove 92-1, and a dog 143 which is provided on the second guide pin 84-2 of the second rack gear 82 and operates the first and second position detecting sensors 141 and 142.

When the supporting plate 50 is in the first position as illustrated in FIG. 4, the dog 143 provided on the second guide pin 84-2 of the second rack gear 82 operates the first position detecting sensor 141 which is disposed adjacent to the motor 100. When the first position detecting sensor 141 is activated, the motor controller 150 receives a signal from the first position detecting sensor 141 and recognizes that the supporting plate 50 is positioned at the first position. In other words, when the signal is received from the first position detecting sensor 141, the motor controller 150 identifies that the display part 20 is completely accommodated in the housing 10 and the screen 21 is not exposed to the outside.

When the supporting plate 50 is in the second position as illustrated in FIG. 7, the dog 143 provided on the second guide pin 84-2 of the second rack gear 82 operates the second position detecting sensor 142 which is disposed adjacent to the side wall of the housing 10. When the second position detecting sensor 142 is activated, the motor controller 150 receives a signal from the second position detecting sensor 142 and recognizes that the supporting plate 50 is positioned at the second position. In other words, when the signal is received from the second position detecting sensor 142, the motor controller 150 identifies that the display part 20 protrudes upward from the housing 10 and the screen 21 is completely exposed to the outside.

In the case of the present embodiment, limit switches are used as the position detecting sensors 141 and 142 constituting the position detector. However, this is only an example, and the position detecting sensor is not limited thereto.

The supporting plate 50 may be guided with respect to the inner side walls of the housing 10 so that the lifter 40 stably maintains the up and down movement of the supporting plate 50. To this end, a pair of guides 51 are provided at both ends of the supporting plate 50. In other words, the pair of guides 51 are provided to extend downward from both ends of the supporting plate 50. The guide 51 is disposed perpendicular to the supporting plate 50 and is fixed to the supporting plate 50 by a fixing bracket 55.

A pair of guide receiving portions 130 for guiding the up and down movement of the pair of guides 51 provided on the supporting plate 50 are provided on both inner side walls of the housing 10.

Referring to FIG. 6, each of the guides 51 includes two parallel protrusions 52 formed in a vertical direction and each of the guide receiving portions 130 includes two elongated grooves 131 in which the two protrusions 52 of the guide 51 are received. The two elongated grooves 131 are formed to have a length corresponding to the height of the housing 10 in the vertical direction. Therefore, when the supporting plate 50 is raised or lowered by the lifter 40, the pair of guides 51 provided at both ends of the supporting plate 50 are moved in the vertical direction along the pair of guide receiving portions 130 provided on the inner side walls of the housing 10. Therefore, the up and down vertical movement of the supporting plate 50 is stably guided by the pair of guides 51 and the pair of guide receiving portions 130.

In addition, the lifter 40 may include at least one damper 110 provided on one side of the second rack gear support member 92. The damper 110 is formed to absorb an impact when the display part 20 is lowered. The damper 110 may also reduce the load which is applied to the driver 80 when the lifter 40 raises the display part 20.

In the case of the present embodiment, as illustrated in FIGS. 7 and 9, two dampers 110 are provided on one side of the second rack gear support member 92 and perpendicular to the bottom surface of the housing 10. The damper 110 includes a damper body 111 and a damper rod 112 disposed to protrude and retreat relative to the damper body 111. Therefore, when the supporting plate 50 of the lifter 40 is lowered, the top end of the damper rod 112 comes into contact with the supporting plate 50. When the supporting plate 50 is continuously lowered, the rod 112 of the damper 110 is inserted into the damper body 111 and absorbs the impact of the supporting plate 50.

Further, the lifter 40 may further include a support damper 120 disposed between the first link 60 and the first rack gear 81 or between the second link 70 and the second rack gear 82. In the case of the embodiment as illustrated in FIGS. 7 to 9, the support damper 120 is provided between the first link 60 and the first rack gear 81. In detail, one end of the support damper 120 is rotatably connected to one end of the first rack gear 81, and the other end of the support damper 120 is rotatably connected to the substantially central portion 63 of the first link 60. Therefore, the first rack gear 81, the support damper 120, and a portion of the first link 60 form a triangle. Accordingly, when the first rack gear 81 is moved by the pinion 85, the first link 60 may be stably rotated with respect to the first rack gear 81 by the support damper 120. Further, the support damper 120 functions to mitigate the impact applied to the lifter 40 when the supporting plate 50 is completely lowered.

The motor 100 of the lifter 40 is controlled by the motor controller 150. The motor controller 150 may be disposed in the display part 20. For example, as illustrated in FIG. 4, the motor controller 150 may be disposed on one side of the controller 160 in the rear surface of the display part 20.

The motor controller 150 may be configured to control the state in which the display part 20 protrudes from the top end of the housing 10. As one example, the motor controller 150 may be configured to control the lifter 40 such that the display part 20 is positioned at four heights with respect to the housing 10.

In detail, the motor controller 150 may control the lifter 40 to position at one of the first position where the supporting plate 50 of the lifter 40 is positioned at the lowest height and the screen 21 of the display part 20 is not exposed from the top end of the housing 10, the second position where the supporting plate 50 of the lifter 40 is positioned at the highest height and the screen 21 is completely exposed from the top end of the housing 10, a third position where the supporting plate 50 of the lifter 40 is slightly raised from the first position and a portion of the screen 21 is exposed through the opening 11 at the top end of the housing 10, and a fourth position where the supporting plate 50 of the lifter 40 is raised higher than the third position and lower than the second position and the screen 21 is exposed through the top end of the housing 10 more than the third position. At this time, the fourth position may be a position where the aspect ratio of the exposed portion of the screen 21 is 21:9. In the case in which the aspect ratio of the screen 21 of the display part 20 is 16:9, when the supporting plate 50 of the lifter 40 is positioned at the second position, the viewer can watch an image having the aspect ratio of 16:9.

A selection switch 22 configured to select a protruding state of the display part 20 may be provided on the top end of the display part 20. Referring to FIG. 5, five selection switches 22 are provided on the top end of the display part 20. The four selection switches 22 correspond to the four positions at which the display part 20 can be positioned, respectively. Accordingly, when one of the four switches 22 is pressed, the display part 20 is positioned at a position corresponding to the selected selection switch 22. The remaining one switch is a power button for turning on/off the image sound device 1.

Hereinafter, an operation of an image sound device having a display part that can appear and disappear according to an embodiment of the present disclosure will be described with reference to the accompanying drawings.

When the image sound device 1 having a display part that can appear and disappear is not used, the display part 20 is positioned at the first position where the screen 21 of the display part 20 is not exposed to the outside as illustrated in FIG. 1.

When the display part 20 is positioned at the first position, the state of the lifter 40 is illustrated in FIGS. 4 and 14. When the supporting plate 50 of the lifter 40 is positioned at the first position, the first link 60 and the second link 70 are positioned in a substantially horizontal state. At this time, the other end 62 of the first link 60 and the other end 72 of the second link 70 are farthest apart from each other. Further, the dog 143 provided on the second guide pin 84-2 of the second link 70 operates the first position detecting sensor 141. Therefore, the motor controller 150 may recognize that the supporting plate 50 of the lifter 40 is in the first position.

The display part 20 may be operated even when the screen 21 of the display part 20 is accommodated in the housing 10 and is not exposed to the outside as illustrated in FIG. 1. For example, the display part 20 may output only sound without displaying an image in the state where the display part 20 is accommodated in the housing 10. Alternatively, only an image may be displayed without sound output. In this case, the user may recognize the image displayed on the screen 21 through the plurality of through holes 15*a* provided in the front surface 15 of the housing 10. Therefore, in this case, the image to be output on the screen 21 may be a special image that can be recognized from the outside through the plurality of through holes 15*a* and can give a certain effect such as a decorative effect, a lighting effect, or the like to the housing 10 rather than a general image. Alternatively, the display part 20 may output image and sound at the same time in the state where the display part 20 is completely accommodated in the housing 10.

Figure 10:
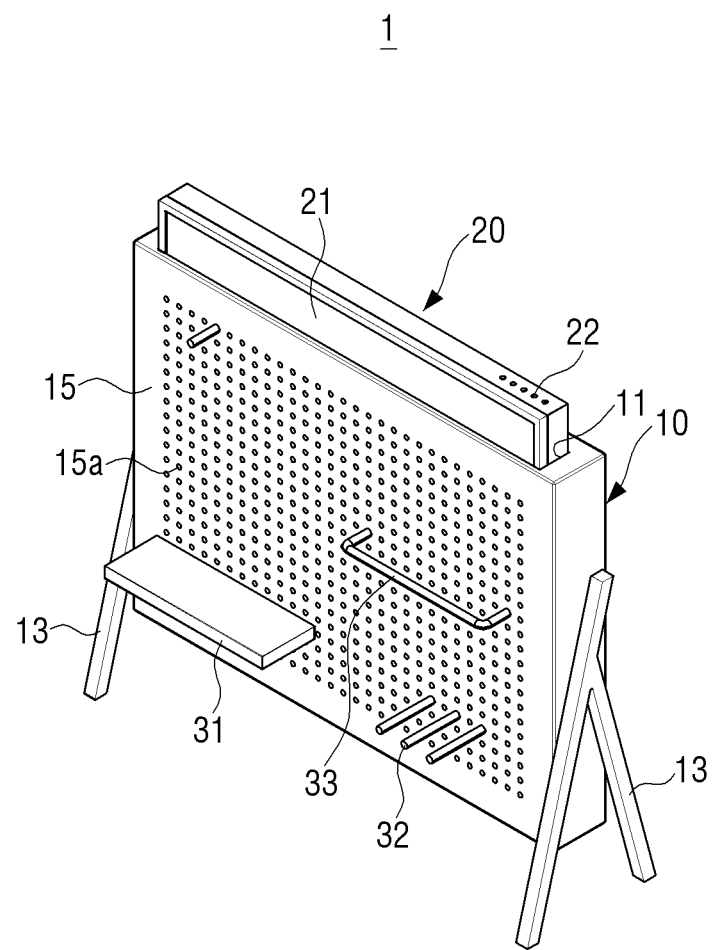
FIG. 10 is a perspective view illustrating a case in which an image sound device having a display part that can appear and disappear according to an embodiment of the present disclosure is used as a sound device.
Figure 11:
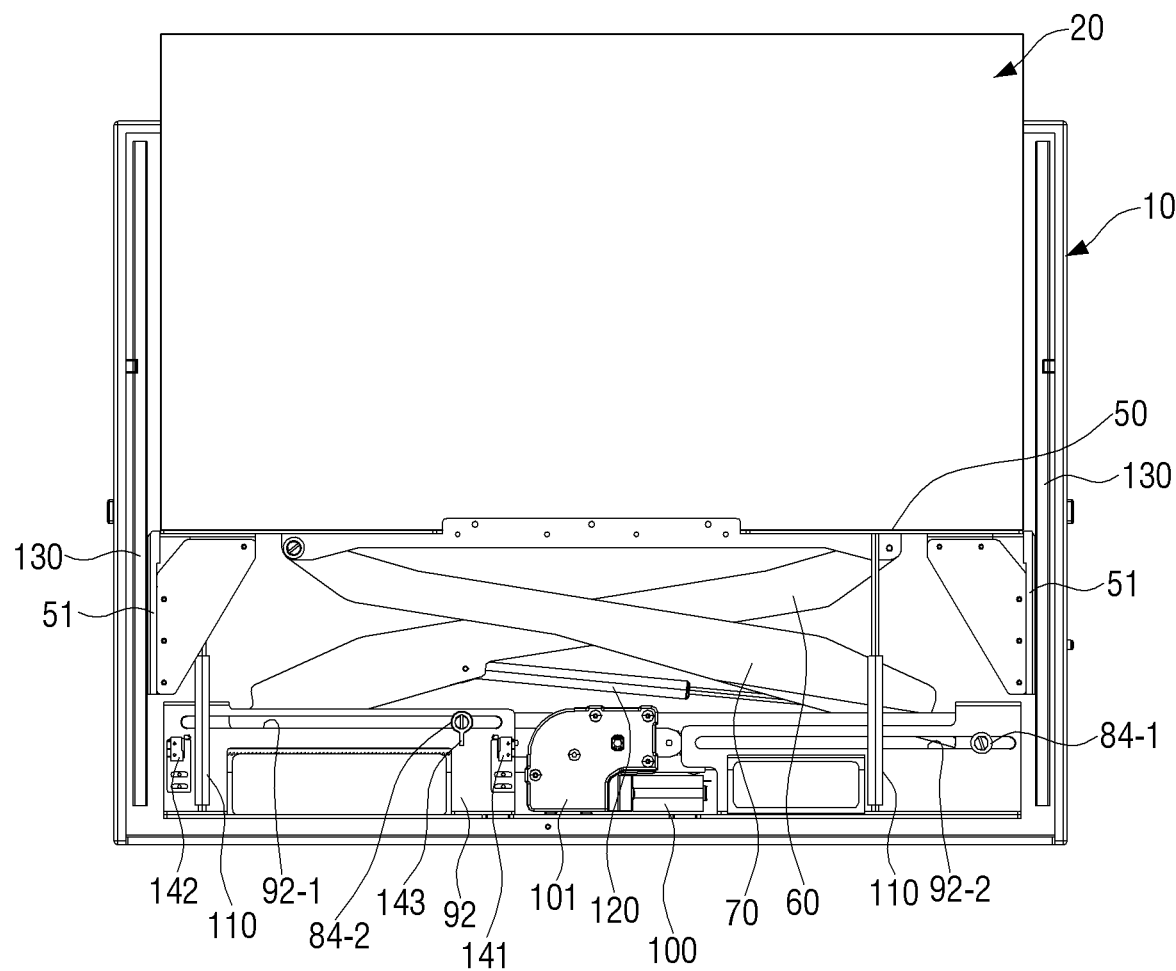
FIG. 11 is a view illustrating a lifter of the image sound device having the display part that can appear and disappear of FIG. 10.

When the user wants to use the image sound device 1 having a display part that can appear and disappear as the sound device, the user presses the selection switch 22 corresponding to the third position to position the display part 20 at the third position as illustrated in FIG. 10.

When the selection switch 22 corresponding to the third position is pressed, the motor 100 of the driver 80 is operated to rotate the pinion 85 so that the first rack gear 81 and the second rack gear 82 are moved in the directions in which the other end 62 of the first link 60 and the other end 72 of the second link 70 approach each other. For example, in FIG. 14, when the pinion 85 rotates in the counter-clockwise direction, the first rack gear 81 is moved in the direction of arrow A and the second rack gear 82 is moved in the direction of arrow B so that the other end 62 of the first link 60 and the other end 72 of the second link 70 are brought close to each other. When the supporting plate 50 is raised to a predetermined height, the motor controller 150 stops the motor 100. Thus, the screen 21 of the display part 20 is protruded from the top end of the housing 10 by a predetermined height as illustrated in FIG. 10. At this time, the dog 143 provided on the second guide pin 84-2 of the second rack gear 82 is spaced apart from the first position detecting sensor 141.

Accordingly, when the display part 20 is positioned at the third position, the screen 21 of the display part 20 is slightly exposed from the top end of the housing 10 as illustrated in FIG. 10. At this time, the size of the portion of the screen 21 exposed from the housing 10 may be determined to display information of the sound to be output.

Figure 12:
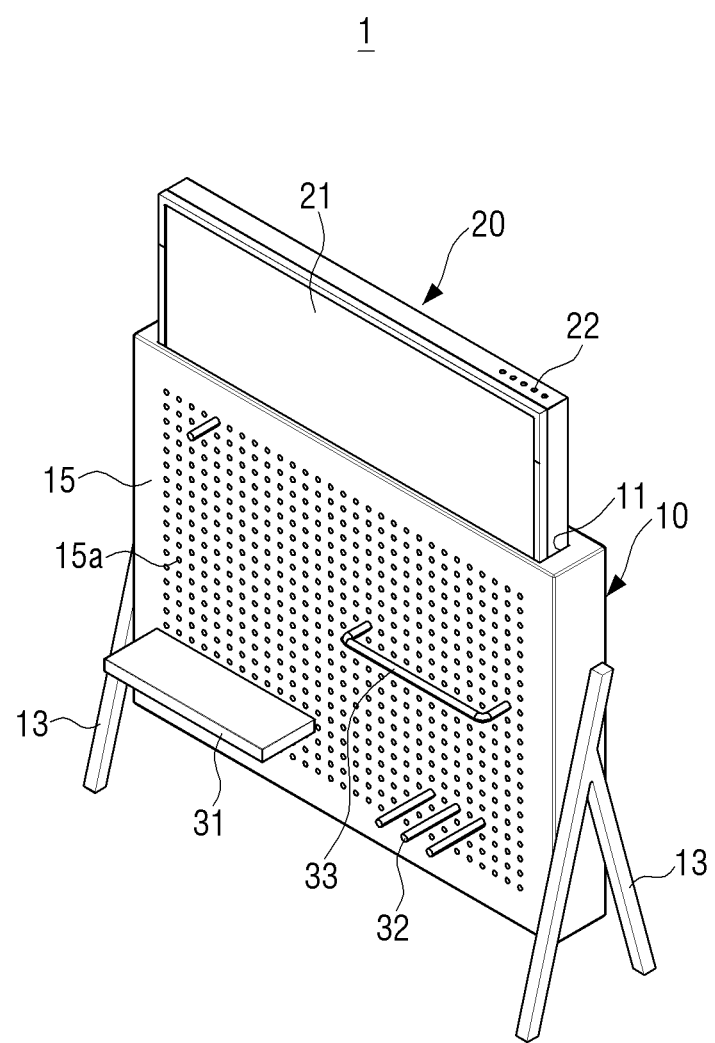
FIG. 12 is a perspective view illustrating a case in which an image sound device having a display part that can appear and disappear according to an embodiment of the present disclosure is operated as an image device for displaying an image having an aspect ratio of 21:9.
Figure 13:
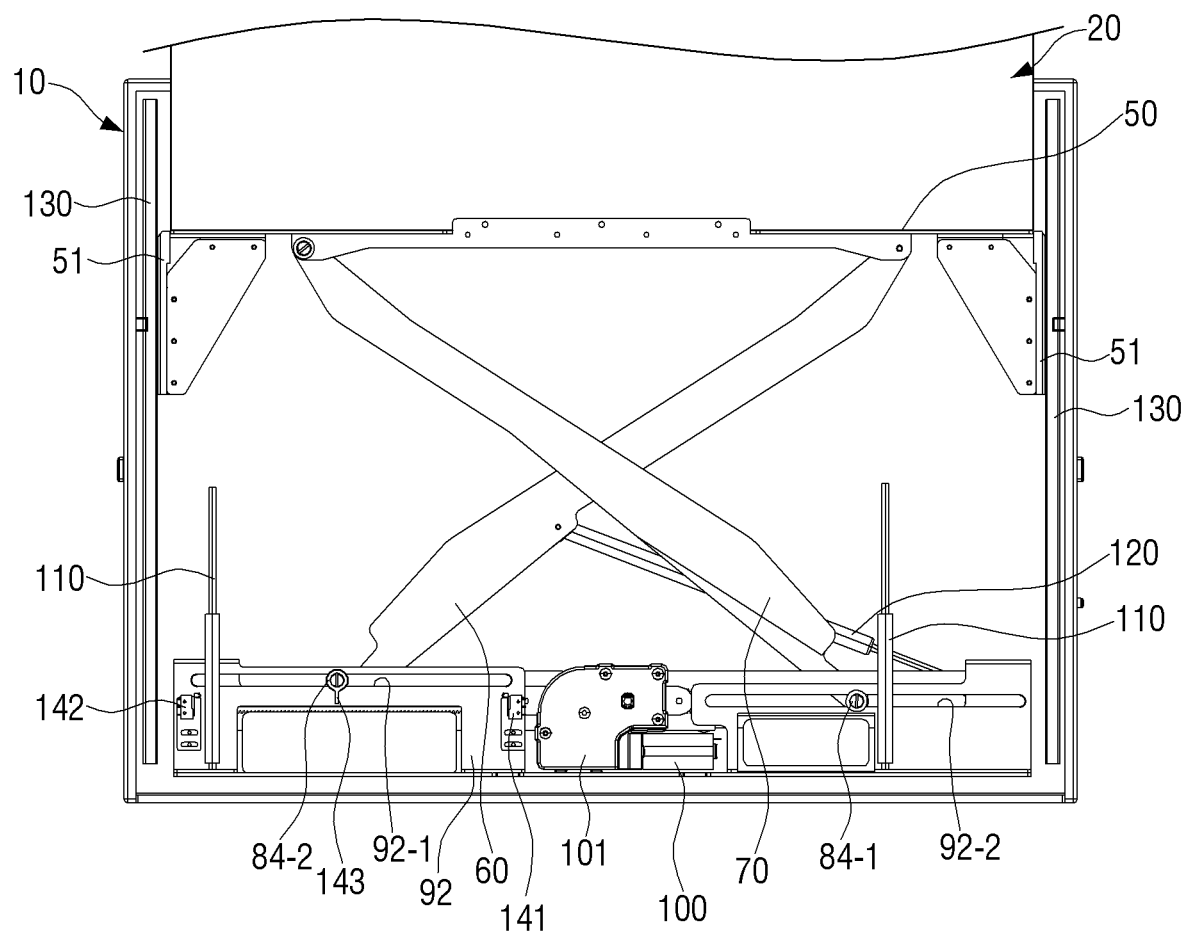
FIG. 13 is a view illustrating a lifter of the image sound device having the display part that can appear and disappear of FIG. 12.

When the user wants to use the image sound device 1 having a display part that can appear and disappear as the image device having the aspect ratio of 21:9, the user presses the selection switch 22 corresponding to the fourth position to position the display part 20 at the fourth position as illustrated in FIG. 12.

When the selection switch 22 corresponding to the fourth position is pressed, the motor 100 of the driver 80 is operated to rotate the pinion 85 so that the first rack gear 81 and the second rack gear 82 are moved in the directions in which the other end 62 of the first link 60 and the other end 72 of the second link 70 approach each other. For example, in FIG. 14, when the pinion 85 rotates in the counter-clockwise direction, the first rack gear 81 is moved in the direction of arrow A and the second rack gear 82 is moved in the direction of arrow B so that the other end 62 of the first link 60 and the other end 72 of the second link 70 are brought close to each other. At this time, the distance between the other end 62 of the first link 60 and the other end 72 of the second link 70 is smaller than the distance between the other end 62 of the first link 60 and the other end 72 of the second link 70 which are positioned at the third position.

When the supporting plate 50 is raised to a predetermined height corresponding to the fourth position, the motor controller 150 stops the motor 100. Thus, the screen 21 of the display part 20 is more protruded from the top end of the housing 10 than the third position as illustrated in FIG. 12. At this time, the dog 143 provided on the second guide pin 84-2 of the second rack gear 82 is positioned closer to the second position detecting sensor 142 than the first position detecting sensor 141, but does not operate the second position detecting sensor 142.

Accordingly, when the display part 20 is positioned at the fourth position, the screen 21 is protruded from the top end of the housing 10 so that the aspect ratio of the screen 21 is 21:9 as illustrated in FIG. 12. Therefore, when an image having an aspect ratio of 21:9 is displayed in this state, the screen 21 filled with an image can be seen without a black screen.

When the user desires to completely expose the screen 21 of the display part 20 of the image sound device 1 having a display part that can appear and disappear, the user presses the selection switch 22 corresponding to the second position to position the display part 20 at the second position as illustrated in FIG. 3.

When the selection switch 22 corresponding to the second position is pressed, the motor 100 of the driver 80 is operated to rotate the pinion 85 so that the first rack gear 81 and the second rack gear 82 are moved in the directions in which the other end 62 of the first link 60 and the other end 72 of the second link 70 approach each other. For example, in FIG. 14, when the pinion 85 rotates in the counter-clockwise direction, the first rack gear 81 is moved in the direction of arrow A and the second rack gear 82 is moved in the direction of arrow B so that the other end 62 of the first link 60 and the other end 72 of the second link 70 are brought close to each other. At this time, the distance between the other end 62 of the first link 60 and the other end 72 of the second link 70 is smaller than the distance between the other end 62 of the first link 60 and the other end 72 of the second link 70 which are positioned at the fourth position.

When the dog 143 provided on the second guide pin 84-2 of the second rack gear 82 operates the second position detecting sensor 142, the motor controller 150 stops the motor 100. Thus, the screen 21 of the display part 20 is completely protruded through the top end of the housing 10 as illustrated in FIG. 3.

Accordingly, when the aspect ratio of the screen 21 of the display part 20 is 16:9, the aspect ratio of the exposed screen 21 is 16:9. Therefore, when an image having an aspect ratio of 16:9 is displayed in this state, the screen 21 filled with an image can be seen without a black screen.

When the user desires to insert the display part 20 of the image sound device 1 having a display part that can appear and disappear into the housing 10 to prevent the screen 21 from being exposed to the outside, the user presses the selection switch 22 corresponding to the first position to position the display part 20 at the first position as illustrated in FIG. 1.

Figure 15:
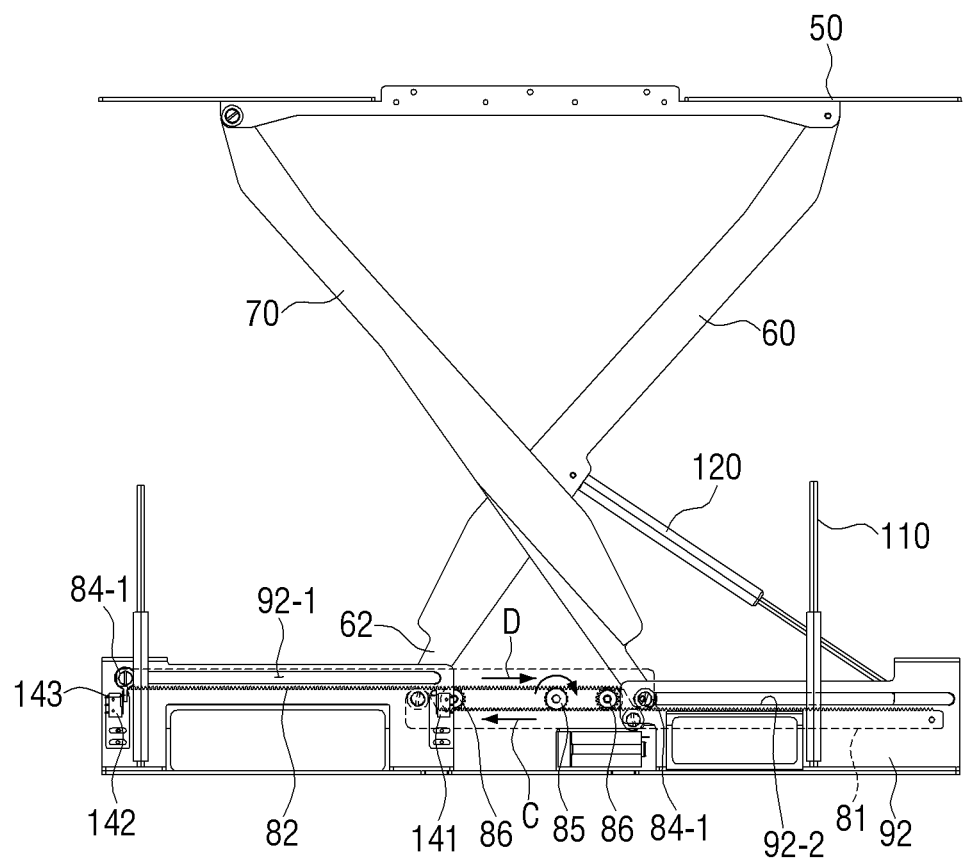
FIG. 15 is a view illustrating a state in which a lifter of an image sound device having a display part that can appear and disappear according to an embodiment of the present disclosure is completely unfolded.

When the selection switch 22 corresponding to the first position is pressed, the motor 100 of the driver 80 is operated to rotate the pinion 85 so that the first rack gear 81 and the second rack gear 82 are moved in the directions in which the other end 62 of the first link 60 and the other end 72 of the second link 70 are moved away from each other. For example, in FIG. 15, when the pinion 85 rotates in the clockwise direction, the first rack gear 81 is moved in the direction of arrow C and the second rack gear 82 is moved in the direction of arrow D so that the other end 62 of the first link 60 and the other end 72 of the second link 70 are moved away from each other.

When the second rack gear 82 moves in the direction of arrow D and the dog 143 provided on the second guide pin 84-2 of the second rack gear 82 operates the second position detecting sensor 142, the motor controller 150 stops the motor 100. Thus, the screen 21 of the display part 20 is completely inserted into housing 10 through the opening 11 at the top end of the housing 10 as illustrated in FIG. 1.

In the above description, the selection of the protrusion height of the display part is made by using the selection switches provided on the display part. However, as another example, the protrusion height of the display part may be selected by using a remote controller. In this case, a plurality of selection buttons corresponding to the plurality of positions of the display part may be provided on the remote controller. For example, when the display part may be positioned at four positions as in the present embodiment, the remote controller may be provided with four selection buttons corresponding to these four positions.

As described above, the image sound device having a display part that can appear and disappear according to an embodiment of the present disclosure is convenient in that it may be used as a decorative furniture that decorates the room, an image device, and a sound device with one device.

In addition, the image sound device having a display part that can appear and disappear according to an embodiment of the present disclosure can adjust the height of a screen. Therefore, when an image having an aspect ratio of 21:9 is displayed on a screen of a display part having an aspect ratio of 16:9, a black screen may be made invisible.

Further, the image sound device having a display part that can appear and disappear according to an embodiment of the present disclosure can accommodate the display part inside the housing, thereby protecting the screen.

The present disclosure has been described above by way example. The terms used herein are for the purpose of description and should not be construed as limiting. Various modifications and variations of the present disclosure are possible in light of the above teachings. Therefore, the present disclosure can be freely carried out within the scope of the claims unless otherwise specified.

The invention claimed is:

1. An image sound device comprising:
    a housing comprising a top end portion that comprises an opening, and a space inside the housing;
    a display comprising a display area for displaying video contents;
    a speaker;
    a lifter comprising:
        a supporting plate supporting the display;
        a first link rotatably disposed at one end of the supporting plate;
        a second link rotatably disposed at another end of the supporting plate and intersecting with the first link; and
        a driver configured to drive one end of the first link and one end of the second link, wherein the one end of the first link and the one end of the second link are moved toward or away from each other in a horizontal direction, and the driver comprises:
            a third link rotatably connected to the one end of the first link;
            a fourth link configured to be parallel to the third link and rotatably connected to the one end of the second link;
            a pinion disposed between the third link and the fourth link and configured to move the third link and the fourth link in directions opposite to each other;
            a first gear and a second gear disposed between the third link and the fourth link, and configured to stabilize movement of the third link and the fourth link;
            a motor configured to rotate the pinion;
            a motor controller configured to control the lifter to move the display to be positioned at two or more positions; and
            a controller configured to control the display to display an image on the display area and output sound,
    wherein one of the two or more positions comprises:
        a first position at which the display area is not exposed from the top end portion of the housing;
        a second position at which a first portion of the display area is exposed from the top end portion of the housing and displays an image; and
        a third position at which the display is moved upward out of the housing through the opening of the top end portion of the housing and stops such that a partial portion of the display area of the display is maintained in a vertically standing position outside the housing and displays an image, wherein the partial portion of the display area has a size less than a size of the first portion of the display area, and wherein the controller is configured to:
output only audio content through the speaker without displaying an image in a state in which the display area of the display is disposed in the first position; and
output information relating to the audio content on the partial portion of the display area of the display when the display area of the display is in the third position.

2. The image sound device of claim 1, wherein the driver further comprises:
a pair of first guide pins disposed at both ends of the third link;
a pair of second guide pins disposed at both ends of the fourth link;
a first support member disposed parallel to the third link and disposed with a first guide groove into which the pair of first guide pins are inserted; and
a second support member disposed parallel to the fourth link and disposed with a second guide groove into which the pair of second guide pins are inserted.

3. The image sound device of claim 2, wherein two first guide pins included in the pair of first guide pins are disposed in the third link at different heights from each other, and
two second guide pins included in the pair of second guide pins are disposed in the fourth link at different heights from each other.

4. The image sound device of claim 1, wherein the lifter further comprises:
a pair of guides extending from both ends of the supporting plate; and
a pair of guide receiving portions disposed in both inner side walls of the housing and configured to receive the pair of guides and guide a vertical movement of the pair of guides.

5. The image sound device of claim 4, wherein the pair of guides are disposed in two parallel protrusions, and
the pair of guide receiving portions are disposed in two elongated grooves to receive the two parallel protrusions.

6. The image sound device of claim 1, wherein the lifter further comprises at least one damper configured to absorb an impact when the display is lowered.

7. The image sound device of claim 6, wherein the at least one damper comprises two dampers vertically disposed on a bottom surface of the housing.

8. The image sound device of claim 6, wherein the at least one damper comprises a support damper disposed between the first link and the third link or between the second link and the fourth link.

9. The image sound device of claim 1, wherein the lifter further comprises a position detector configured to detect a position of the supporting plate.

10. The image sound device of claim 1, wherein at least one of a front surface and a rear surface of the housing comprises a plurality of through holes.

11. The image sound device of claim 10, wherein the speaker is disposed inside the housing.

* * * * *